UNITED STATES PATENT OFFICE.

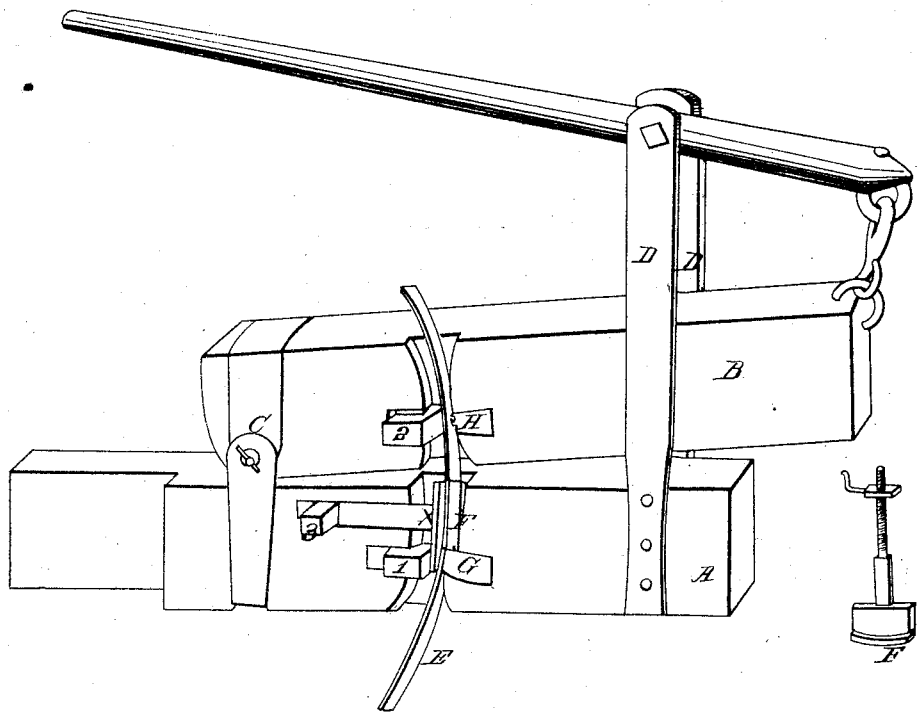

WILLIAM MASSEY, OF GREENE COUNTY, ILLINOIS.

MACHINE FOR CONTRACTING THE CIRCUMFERENCE OF WROUGHT-IRON BANDS.

Specification forming part of Letters Patent No. 6,573, dated July 3, 1849; Reissued January 24, 1860, Nos. 887 and 888.

*To all whom it may concern:*

Be it known that I, WILLIAM MASSEY, of the county of Greene and State of Illinois, have invented a new and useful machine for contracting by compression the circumference of wrought-iron bands, wagon-tires, &c., without cutting out a piece and for compressing and shrinking every variety of wrought-iron bands; and I do hereby declare that the following is a full, clear, and exact description of the construction and operation of the same, reference being had to the annexed drawings, making a part of this specification.

*Description.*—To enable others to make and use my invention I will describe this machine. I beg leave for the sake of distinction to call each lever, plate, wedge, and part, thereof by the name of the letter or figure marked thereon.

The permanent lever (by some called sill) of the machine is represented and marked upon the accompanying drawing of the machine with the letter A.

The moving lever, upon the drawing is marked with the letter B.

The joint of the two levers at the point of their connection is marked C.

The two guides to the moving lever are marked D.

The band or tire to be operated on is marked E.

I have drawn a sectional view of plate F which is placed at the right hand on the drawings (which I shall call plate F).

It will be seen that there is a narrow flange arising from the outer edge on the concave side of said plate near the top of the letter F. The use of said flange is to keep the outer edge of the wagon tire or band, true and straight and to prevent it from spreading out during the operation of the machine. It also acts as a gage for the width of the tire, and prevents its spreading edgewise. It will also be seen that there is a bolt or handle to said plate—this bolt or handle when the plate is placed in the machine, extends back through the sill or lever A. On the end of this bolt or handle is placed a screw the use of which is to hold said plate by this handle, firm and immovable at any desired point. And by loosening or tightening said screw the plate is made to fit the exact width of any band, or wagon tire, and the concave side of the plate also forms the front part of the iron mold or track in which the heated iron is to be compressed. In an ordinary machine the size of said plate should be about six by eight inches square exclusive of the flange and handle. As the two movable plates F and I are the most important parts of said machine; as well as the most difficult to describe, I will therefore go on to describe them in connection. It will be seen they are both placed in the same sill or lever facing each other but on opposite sides of the track or avenue wherein the heated part of the wagon tire is to be placed when operated on and thus there is formed by these two plates an iron track or mold into which the heated part of the band or tire (painted red) is to be forced by the compression which is caused when the levers A and B are brought or forced together (as will be spoken of hereafter). It will be seen that both these plates are movable yet in different directions—plate F is movable to and from, the front part of said sill through which the bolt or handle of the said plate does pass, plate I it will be seen is movable lengthwise of said sill—there is no flange thereon—but it has a bolt or handle, which is placed in a groove or avenue in said sill, and is not regulated by a screw to extend or to contract it as is the other, but by the wedge No. 3. It will be seen that the face of plate I is some longer than the other so that the extreme lower end thereof extends down opposite the indented plate G, so that when wedge No. 1, is hard driven the lower end of plate I, is thereby forced against the tire or band, to be operated on and holds it firm and immovable against the indented plate G, which forms the lower end of the mold. Yet the two plates F and I, above G, are left a little loose or drawn back from touching said wagon tire either on the outer or inner sides thereof so as to leave just room enough to be filled up by the swelling of the tire when compressed. As the heated part is thereby forced down endwise and fills up said iron track or mold causing the tire to swell in thickness; and thus the wagon tire is shrunk in circumference in an instant and the part operated upon made much thicker and stronger thereby.

The letter G shows in the permanent sill or lever A an indented iron plate toothed on the end which comes directly against the tire or band at the bottom of the plate F and directly opposite to the iron wedge No. 1, so that when said wedge is hard driven, the lower end of plate I is thereby forced against the tire or band to be operated on and holds it firm and immovable against the indented plate G (as above described).

The letter H also represents an indented plate toothed which is in the upper or movable lever B, which is situated opposite the iron wedge No. 2, the tire or band passing between them so that when wedge No. 2 is driven, the tire is permanently held between the wedge and toothed plate H in the upper or movable lever.

*Descriptive operation.*—For example we wish to shrink a band of iron one inch, we suppose the machine to be in the same position as represented in the chart. In the first place we raise the movable lever B, up from the permanent lever A, so that they are just one inch apart at the mold formed by the plates F, and I. This is the position the machine is to be in when the iron band (about five inches of which having been previously heated to a proper temperature) is to be placed in the machine as represented by E, in the drawings the heated part being placed between plates F, and I, as shown by the parts printed red; then drive the wedges Nos. 1, and 2, which firmly holds the band above and below the heated part and so secures it that it cannot move—only as the machine forces the heated iron into the track or mold which is done by letting or forcing down lever B, upon lever A, and thus the iron band is contracted to the desired circumference in an instant.

One great advantage gained by this process is; the slenderest part of the tire being selected—and operated upon—is thereby made thicker and stronger than before and avoids the danger of flaws or burning of the iron as is the case in the usual way of cutting and welding. The same principle is applicable whether a greater or less amount of contraction be required. The drawings represent a large machine lever A, being 12 by 14 inches B, 10 inches square made of wood, yet they may be made of iron and proportionately smaller and more neatly finished.

What I claim as my invention and desire to secure by Letters Patent is—

A machine for contracting by compression the circumference of every variety of wrought-iron bands, wagon-tires &c.; and for compressing and shrinking the same as herein described—thereby dispensing with cutting and welding.

WM. MASSEY.

Witnesses:
I. N. PIGGOTT,
F. P. VEDDEN.

[FIRST PRINTED 1913.]